: US 8,271,716 B2
(45) Date of Patent: Sep. 18, 2012

(54) VIRTUALIZATION OF AN INPUT/OUTPUT DEVICE FOR SUPPORTING MULTIPLE HOSTS AND FUNCTIONS BY USING AN INGRESS MANAGER FOR ACCEPTING INTO A BUFFER COMMUNICATIONS IDENTIFIED BY FUNCTIONS HOSTED BY A SINGLE HOST

(75) Inventor: Arvind Srinivasan, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 250 days.

(21) Appl. No.: 12/697,940

(22) Filed: Feb. 1, 2010

(65) Prior Publication Data

US 2011/0191518 A1 Aug. 4, 2011

(51) Int. Cl.
*G06F 13/36* (2006.01)
(52) U.S. Cl. ............................ 710/310; 710/311; 710/7
(58) Field of Classification Search .......... 710/306–317, 710/22–36, 1–19
See application file for complete search history.

(56) References Cited

U.S. PATENT DOCUMENTS

| 7,376,767 | B1 * | 5/2008 | Black et al. ..................... 710/52 |
|---|---|---|---|
| 7,827,325 | B2 * | 11/2010 | Adar et al. ..................... 710/29 |
| 2006/0248242 | A1 * | 11/2006 | Andersen et al. ............... 710/52 |
| 2009/0089464 | A1 * | 4/2009 | Lach et al. ..................... 710/62 |
| 2009/0100297 | A1 * | 4/2009 | Srinivasan et al. ............. 714/43 |
| 2009/0304022 | A1 * | 12/2009 | Yang et al. ..................... 370/463 |
| 2010/0161870 | A1 * | 6/2010 | Daniel .......................... 710/314 |
| 2010/0161872 | A1 * | 6/2010 | Daniel .......................... 710/316 |
| 2011/0072172 | A1 * | 3/2011 | Rodrigues et al. ............. 710/52 |

* cited by examiner

*Primary Examiner* — Raymond Phan
(74) *Attorney, Agent, or Firm* — Park, Vaughan, Fleming & Dowler LLP

(57) ABSTRACT

Methods and apparatus are provided for simultaneously supporting multiple hosts with a single communication port; each host may host multiple functions. The input/output device comprises multiple buffers; each buffer stores packets for one host, but can be dynamically reallocated to a different host. Multiple buffers may simultaneously support the same host and all of its functions. After a packet is received and classified, it is distributed to buffer ingress managers. Within a set of ingress managers serving one buffer, each manager corresponds to one function of the buffer's corresponding host, and is programmed with criteria for identifying packets desired by that function. One copy of the packet is stored in a buffer if at least one of the buffer's ingress managers accepts it, along with control information for processing the packet upon egress from the buffer. Egress managers for each buffer extract packets and transfer them to destination host/functions.

19 Claims, 3 Drawing Sheets

VIRTUALIZATION OF AN INPUT/OUTPUT DEVICE FOR SUPPORTING MULTIPLE HOSTS AND FUNCTIONS BY USING AN INGRESS MANAGER FOR ACCEPTING INTO A BUFFER COMMUNICATIONS IDENTIFIED BY FUNCTIONS HOSTED BY A SINGLE HOST

BACKGROUND

This invention relates to the field of computers. More particularly, apparatus and methods are provided for virtualizing an input/output device to allow multiple hosts and functions to share a single port of the device.

Virtualized I/O devices provide considerable value because they allow a high-performance peripheral component to be shared among multiple applications, making it seem as if each application is receiving a separate, dedicated I/O device. From an application's perspective, each virtual device is completely isolated, and the device driver associated with each virtual device is unaware of the existence of any other. By isolating each virtual device's data from all other virtual devices, data privacy and integrity can be assured.

Peripheral Component Interconnect Express (PCIe) is a very widely used, standardized, computer system I/O technology. PCIe includes a virtualization model in which a Function operating on a host provides hardware traffic isolation and protection, as well as a standardized interface. Via this standard interface, system software can configure and manage anything from a monolithic input/output device supporting a single Function to a high-throughput input/output device supporting hundreds of virtual Functions.

Sharing of one physical input/output port among multiple Functions through virtualization, especially among multiple Functions hosted by different hosts, has not been successfully implemented because it presents several challenges. Among those challenges are isolating the hosts and Functions (even in the presence of errors), handling packets destined for multiple Functions (e.g., broadcast packets), supporting different data throughput rates for different hosts, and so on.

Thus, apparatus and methods are needed to simultaneously support multiple hosts and multiple Functions on each host via a single input/output port, without allowing one host or Function to block another host or Function.

SUMMARY

In some embodiments of the invention, apparatus and methods are provided for allowing multiple hosts, and multiple functions residing on those hosts, to share one physical port of an input/output device.

In these embodiments, two levels of virtualization are implemented. On one level, the input/output port (e.g., one port of a network interface circuit) simultaneously supports multiple host entities (e.g., PCIe root complexes), allowing each host to act as if it has use of a dedicated device. On a second level, the port simultaneously serves multiple Functions on one or more of the host entities.

The input/output device comprises multiple buffers; each buffer stores packets for any number of functions operating on one host, and can be dynamically reallocated from one host to another. Multiple buffers may simultaneously support the same host and its functions. The device also comprises ingress managers for managing storage of packets within buffers, egress managers for initiating transfer of packets from a buffer to its destination host/functions, and logical bus interfaces for forwarding the packets to their destinations.

Each cooperative combination of one buffer, supporting ingress managers, an egress manager and a bus interface may herein be collectively termed a "host assembly," and the input/output device may comprise any number of such host assemblies.

After a packet is received and classified, it is distributed to each buffer's ingress managers. Within a set of ingress managers serving one buffer, each manager corresponds to one function of the buffer's corresponding host, and is programmed with criteria for identifying packets accepted or desired by that function. A copy of the packet is stored in a buffer if at least one of the buffer's ingress managers accepts it. Control information for processing the packet upon egress from the buffer is also stored in the buffer for each packet.

Egress managers for each buffer extract packets and transfer them to destination functions via logical bus interfaces corresponding to the functions' hosts. In particular, an egress manager ensures a packet is directed to its appropriate destination(s), and passes it to a logical bus interface capable of formatting it for delivery to the host entity via the corresponding physical media.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments of the invention, apparatus and methods are provided for virtualizing a physical port of an input/output device to support multiple hosts and one or more functions on each host.

In some specific implementations, the input/output device is a network interface circuit (NIC), each host comprises a PCIe (Peripheral Component Interconnect Express) root complex and the functions are PCIe functions. Other implementations and embodiments may be readily derived from the following description for environments comprising other types of devices, hosts and communication protocols.

Figure 1:
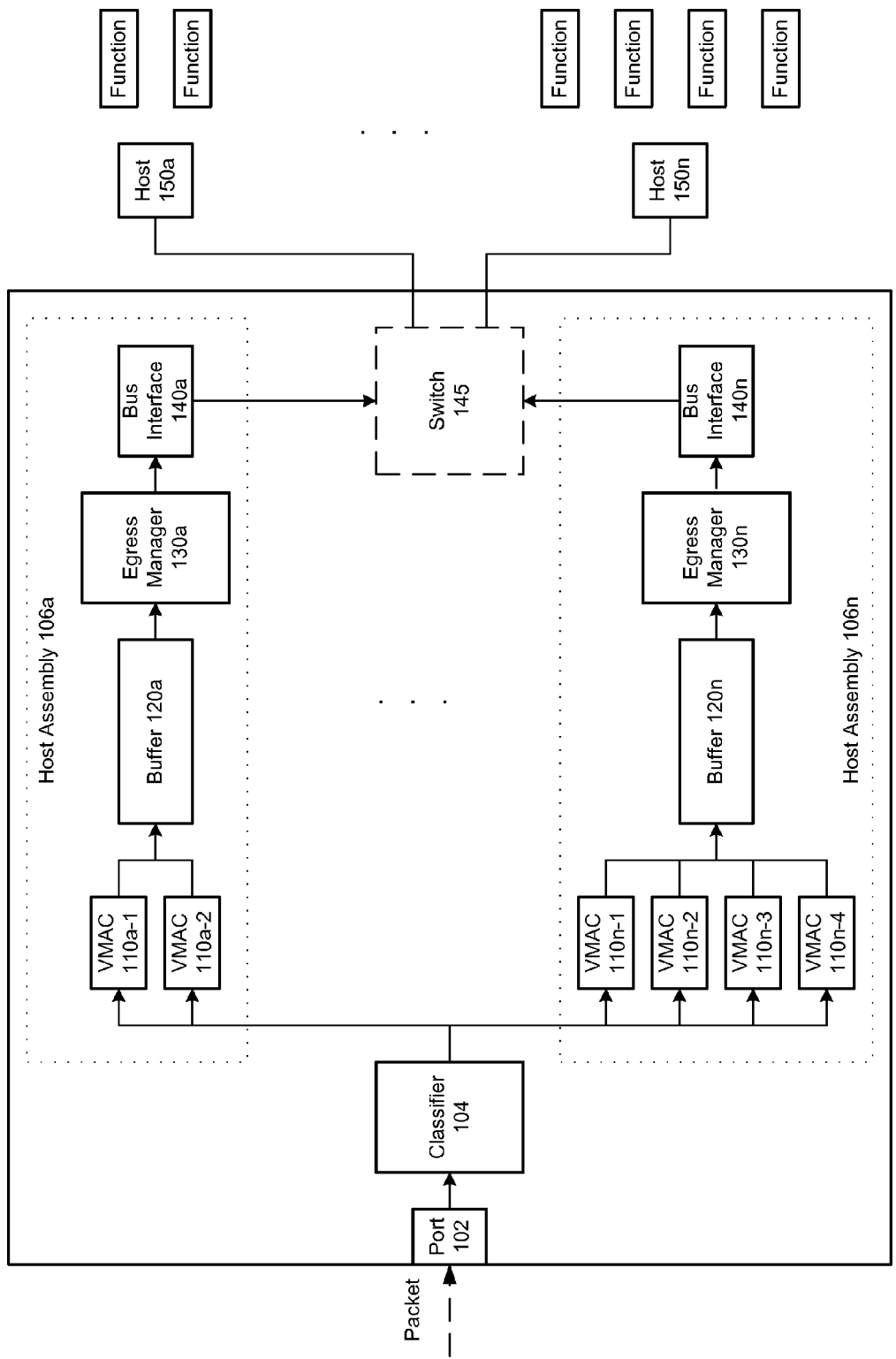
FIG. 1 is a block diagram of a network interface device with which some embodiments of the present invention may be implemented.

FIG. 1 is a block diagram of a network interface device with which some embodiments of the present invention may be implemented. Although FIG. 1 depicts only a single port of the device being virtualized to support multiple hosts and functions, multiple ports of the same device may be simultaneously virtualized in the same manner.

Network interface device 100 of FIG. 1 comprises port 102, classifier 104, one or more host assemblies 106 and optional switch 145. Each host assembly comprises at least one virtual MAC (Medium Access Control modules) 110, packet buffer 120, egress manager 130 and bus interface 140.

The device may be coupled to any number of hosts 150, each of which may host any number of functions. Other components of the network interface device are omitted in the interest of clarity. The network interface device may be implemented as part of a single semiconductor chip.

Port 102 is coupled to a data link and receives (and transmits) communications (e.g., packets, datagrams, cells) on behalf of the hosts and functions it supports. Classifier 104 is configured to classify incoming communications, and may operate to identify one or more destinations (e.g., hosts, functions) for each communication, and/or one or more DMA (Direct Memory Access) engines or other components for transferring the communication to its destination(s).

For example, the classifier may comprise multiple classification tables configured to select a packet's destination function(s) based on its destination address and/or other information gleaned from the packet, and/or select one or more DMA engines for transferring the packet to those functions.

Illustrative methods of managing a classification apparatus to support multiple host functions are described in U.S. patent application Ser. No. 12/633,926, entitled Apparatus and Method for Managing Packet Classification Tables, which was filed Dec. 9, 2009 and is incorporated herein by reference.

Virtual MACs (VMACs) 110 are configured to filter communications, for storage in buffers 120, based on how they have been classified and/or inherent characteristics or attributes of the communications. Buffers 120, which may be implemented as FIFO (First-In, First-Out) queues, are configured to store communications for transfer to their destination hosts and functions, and may be of any suitable size (e.g., 16K, 32K, 64K).

Egress managers 130, which comprise DMA engines and other components, are configured to transfer packet data from the packet buffers to hosts 150 via a corresponding logical bus interface 140 and switch (or other comparable communication component) 145. Logical bus interfaces 140 comprise physical hardware modules that can be dynamically allocated to different hosts (i.e., whichever host the corresponding buffer 120 is allocated to).

Switch 145 may be a multi-root aware switch in the illustrated embodiment of the invention, but in other embodiments may be replaced by other elements capable of preparing a packet or other communication for delivery to a host. Each host comprises an independent PCIe root complex and an associated I/O memory subsystem, and may host any number of physical and/or virtual functions.

Thus, in the illustrative environment of FIG. 1, host 150a hosts two functions, while host 150n hosts four. In this environment, hosts may be implemented as separate blades (or other types of computer processor components) installable in one server or enclosure.

Different hosts may be coupled to device 100 via links of different capacities or speeds (e.g., ×1, ×8), and therefore may exhibit different memory latency patterns. Different hosts may also process incoming packets at different rates, based on their processor configurations, application loads and/or other factors.

In the embodiments of the invention depicted in FIG. 1, each host assembly 106 serves a different host 150, and is supported by one VMAC 110 for each function operating on that host. Thus, in FIG. 1, buffer 120a of host assembly 106a is served by VMACs 110a-1 and 110a-2. Buffer 120n of host assembly 106n is served by VMACs 110n-1, 110n-2, 110n-3 and 110n-4. Each VMAC is dynamically programmable to accept or reject packets meeting specified filtering criteria.

The VMACs may be programmed by their corresponding functions and/or other supervisor entity (e.g., a service processor). The supervisor may also be responsible for instantiating, enabling, disabling, reassigning, terminating or otherwise manipulating VMACs (e.g., when a function is reset, when a new function is initialized, when a new host is coupled to the network interface device, when a host is detached).

After a packet is classified by classifier 104, and if it is not to be dropped, it may be distributed to every VMAC 110 or to some subset of all VMACs. Each VMAC that receives the packet applies its filtering criteria to decide whether to accept the packet into the associated buffer 120 on behalf of its corresponding function.

If at least one VMAC coupled to a given buffer accepts it, the packet is stored in the buffer. Because the packet may be destined for multiple different hosts (e.g., multiple functions operating on different hosts), it may be accepted by VMACs serving different buffers, and may therefore be stored in more than one buffer 120.

Specifically, for host assembly 106a, a packet that is received from classifier 104 and that matches the programmed criteria of either or both VMAC 110a-1 and VMAC 110a-2, is stored in buffer 120a. Similarly, if the packet survives the filtering rules of any of VMACs 110n-1, 110n-2, 110n-3 or 110n-4, it will be stored in buffer 120n of host assembly 106n.

In some implementations, a given VMAC outputs a signal indicating whether to accept a packet based on its programmed filtering criteria. That signal may be OR'd or otherwise combined with signals from its sibling VMACs (i.e., other VMACs feeding the same buffer) to yield a final accept/reject signal for the packet for the supported buffer.

Even if a packet is destined for multiple functions operating on one host, the buffer serving that host may store only a single copy of the packet, along with information identifying its destinations. Upon egress from the buffer, however, multiple copies of the packet may be issued—one for each function. Alternatively, multiple copies of the packet may be stored in the buffer, and coded for different destinations.

In some embodiments of the invention, a VMAC 110 filters packet data based on the DMA engine(s) for which the packets were classified (e.g., by classifier 104). Specifically, one or more DMA engines within network interface device 100 are bound to each function supported by the device, and each buffer 120 is supported by a different set of DMA engines (e.g., as part of egress manager 130). Each VMAC is also associated with a single function, and therefore can be programmed to accept packets classified for the DMA engine(s) bound to its function. A VMAC may reject packets not classified for the DMA engine(s) bound to its function.

In some embodiments, a VMAC may also (or instead) be programmed to accept or reject a packet based on one or more characteristics other than its classification, such as the presence or absence of errors (e.g., checksum, CRC), its size (e.g., jumbo or non-jumbo), any protocol options, etc.

For example, when a function enters promiscuous mode, a corresponding VMAC may be programmed to accept all packets, regardless of classification and characteristics. Yet another function may enter promiscuous mode, but not want to see packets that have errors; a corresponding VMAC will therefore be programmed to accept all packets except those with errors.

Yet another VMAC may be programmed to reject all packets with checksum errors (e.g., even if they are classified for the function). Another VMAC may be programmed to accept all packets having CRC errors, regardless of classification, and so on.

Thus, VMACs may filter packets based on their classification (e.g., DMA engine(s)) and/or inherent characteristics of the packets. Because each supported function is served by its own set of VMACs, which can be programmed with any desired permutation of packet characteristics, the function has very fine-grained control over the packets it will receive. In addition, because each function's filtering criteria is applied independently, one VMAC's rejection of a packet based on its function's criteria will not block any other function from receiving the packet.

Virtual MACs 110 can be dynamically instantiated, destroyed, programmed and reprogrammed by a supervisor entity (e.g., a service processor) that also allocates or binds them to specific physical and/or virtual functions, such as when a host assembly is reassigned to support a different host, or when there is a change in the configuration of the functions operating on one host. A VMAC's bind data identifies the DMA engine(s) bound to its corresponding function, and identifies the criteria to be used to filter packets for the function.

In an illustrative embodiment of the invention, the chip or other circuitry comprising network interface device 100 comprises twelve buffers 120 and associated components (i.e., egress manager 130 and logical bus interface 140). The term "host assembly" can be used to encompass each group of these components, along with the VMACs that filter packets for storage in the buffer. The device may therefore be simultaneously coupled to any number of hosts from one to twelve, inclusive. Also in this embodiment, each host assembly comprises or is allocated up to four DMA engines (e.g., as part of its egress manager 130) for transferring packets to the connected host.

Because any host assembly may be used to support any of multiple different hosts, each assembly's bus interface 140 is configurable to support any host to which device 100 may be coupled.

In implementations of this embodiment in which each host assembly is coupled to and supports a separate host, as in FIG. 1, a host may sustain up to four functions. For example, each function within host 150*n* would be allocated one DMA engine, while DMA engines supporting host 150*a* may be divided two and two or three and one between the two functions.

In other embodiments of the invention, however, multiple host assemblies may be coupled to the same host, thereby allowing that host to use more than four DMA engines and support more than four functions. For example, if host 150*a* were to shut down, then host assembly 106*a* could be reassigned to support host 150*n*. In some circumstances (e.g., with a slow host), multiple host assemblies may be allocated to a single host in order to avoid undesired dropping of packets.

Just as VMACs 110 have bind data that identifies the DMA engine(s) bound to the VMACs' corresponding packet buffer, and that is used to identify packets to accept for those functions, egress managers 130 have associated bind data to identify and locate the hosts they support. For example, each egress manager comprises one or more DMA engines, and each DMA engine is bound to a single function on the supported host.

In embodiments of the invention depicted in FIG. 1, when a packet is stored in a buffer 120, a control header is stored in the same buffer in conjunction with the packet. The control header is formed by the VMAC or VMACs that voted to accept the packet, and is configured to identify the packet's destination(s) (e.g., host/function), why it is being transferred to a host/function, how to transfer the packet from the network interface device (e.g., which DMA engine or engines to use) and/or other information regarding how to process the packet when it is removed from the buffer.

For example, the control header may store attributes of the packet as well as classification attributes produced by a classifier, and may therefore include information such as packet size, presence of errors, which DMA engine(s) the packet was classified for, destination address, a hash computed by hardware (e.g., so that software can use the same hash instead of re-computing it), an indication that promiscuous mode was active, etc. This information may be passed to a destination function so that it can determine why it received the packet (e.g., based on classification, based on packet characteristic, because the function was in promiscuous mode).

In some embodiments of the invention, control headers (or data for generating control headers) may be pre-configured (e.g., by functions) and stored with the VMACs. As the VMACs accept packets, they output the pre-configured data to produce corresponding control headers for insertion in the packet buffer (e.g., ahead of the packet).

In a scenario in which multiple VMACs serving one buffer accept a packet on behalf of different functions, one collective control header may be produced and stored in the buffer with one copy of the packet. The control header will include all information necessary to replicate the packet data (e.g., once for each destination function) upon egress from the buffer.

One of ordinary skill in the art will appreciate that in a traditional network interface device, separate buffers would likely be implemented for packet data and for control information. In embodiments of the present invention such as those illustrated in FIG. 1, a single host assembly and its constituent buffer can support multiple functions and store both data and control information. By accompanying each packet with a specific control header, associations between packets and control headers are more easily managed upon egress from the buffer.

When a function is reset (e.g., through a function level reset) or otherwise becomes unresponsive, VMACs associated with that function may be disabled to prevent the queuing of packets for the function. Detection of function errors that require this action, as well as the subsequent disabling of one or more VMACs may be performed by a service processor or other supervisory entity.

FIG. 1 thus illustrates embodiments of the invention in which multiple hosts and multiple functions on those hosts share a single physical network port. A network interface device such as device 100 comprises multiple host assemblies, each of which may be dynamically allocated to different hosts at different times. Although each host assembly may support only one host at a given time, multiple host assemblies may serve the same host simultaneously.

In the illustrated embodiments, the output of a packet classifier is delivered to each host assembly's ingress management entities. The ingress manager or managers serving one buffer include at least one virtual MAC for each function in the host supported by that buffer, and operate to control the flow of packet data into the buffer based on programmed filter criteria.

Each buffer is also served by one or more egress management entities for transferring packets to destination hosts and functions. The egress managers consume control information associated with each packet to determine where to send the packet data, and deliver packets to logical bus interfaces that forward the packets to their destinations.

U.S. Pat. No. 7,500,046, which issued Mar. 3, 2009 and is entitled "Abstracted Host Bus Interface for Complex High Performance ASICs", describes an interface for coupling a device such as network interface device 100 to different types of host buses.

Figure 2:
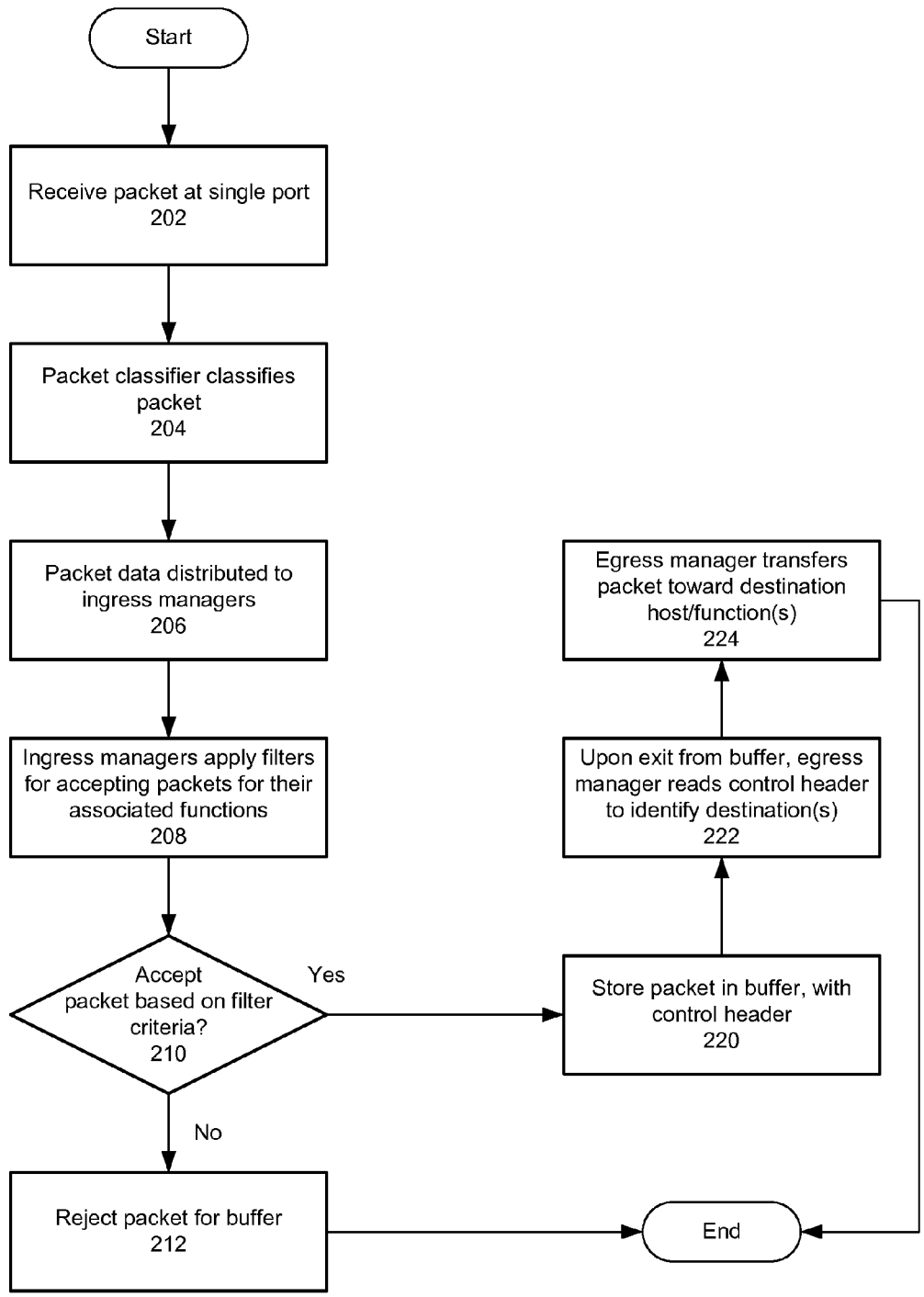
FIG. 2 is a flow chart demonstrating sharing of a single physical communication port among multiple hosts and functions, according to some embodiments of the invention.

FIG. 2 is a flow chart demonstrating sharing of a single physical communication port among multiple hosts and functions, according to some embodiments of the invention.

In operation 202, a packet is received at a port of an input/output device such as a network interface circuit. Multiple hosts, and the functions operating on the hosts, receive packets through the same port.

In operation 204, the packet is classified. In some embodiments it is classified by identifying a set of DMA engines that will be fed the packet for transfer to hosts/functions to which the DMA engines are bound. For example, based on a destination address and/or other key fields, one or more DMA engines that serve the corresponding destination(s) may be identified through a set of classification tables.

In operation 206, the packet is distributed to each host assembly's ingress managers (e.g., VMACs). Each ingress manager serves and may be programmed by a specific function. All ingress managers that serve functions residing on one host operate together to manage ingress to a packet buffer that stores packets for that host.

In operation 208, each ingress manager applies programmed criteria to determine whether to accept the packet on behalf of its function. Each ingress manager may be programmed with virtually any criteria for selecting packets based on classification and/or other characteristics (e.g., size, errors, content of a protocol field), and is configured to generate a signal indicating whether or not the packet should be accepted.

In operation 210, the output signals of all ingress managers of one host assembly are combined or compared to determine whether to accept the packet into the assembly's buffer. In this embodiment of the invention, regardless of how many of the ingress managers vote to receive the packet for their functions, only one copy of the packet data is stored in the buffer.

Operation 210 of FIG. 2 reflects consideration of a packet only for one buffer. However, the same operation is conducted within every host assembly, in order to allow storage of the packet in multiple buffers.

If the packet is accepted by at least one of the host assembly's ingress managers, the method advances to operation 220. Otherwise, the method continues with operation 212.

In operation 212, the packet is rejected. If all ingress managers of all assemblies refuse to accept it, then it is dropped. It may also be noted that ingress managers may be disabled, deactivated or terminated if and when their associated functions are reset or otherwise become unavailable. This helps prevent stray packets (packets that will never be consumed) from occupying space in the buffers.

In operation 220, the packet is stored in each buffer that supports a host having at least one function that will receive the packet. With the packet, in each buffer is stored a control header for indicating how to process the packet upon egress, identify why it was buffered, etc.

In operation 222, when the packet data emerges from the buffer, an egress manager reads the control header and takes action to forward the packet to a destination via a corresponding logical bus interface. Illustratively, an egress manager will read the control header that accompanies the packet data, identify the DMA engine or engines that is/are to transfer the data to their respective functions, calculate the data's destination memory address(es) and any accompanying attributes, and then deliver the packet to a logical bus interface corresponding to the destination host.

Each bus interface is configured to support whichever host its host assembly is currently serving. The bus interface may be reconfigured or reprogrammed to support different physical media and protocols as the host assembly is reallocated to different host entities.

U.S. Pat. No. 12/697,953, also filed Feb. 1, 2010 and entitled "Virtualization of an Input/Output Device for Supporting Multiple Hosts and Functions," provides methods of transferring packets from a buffer to multiple functions of a given host, and is incorporated herein by reference.

Figure 3:
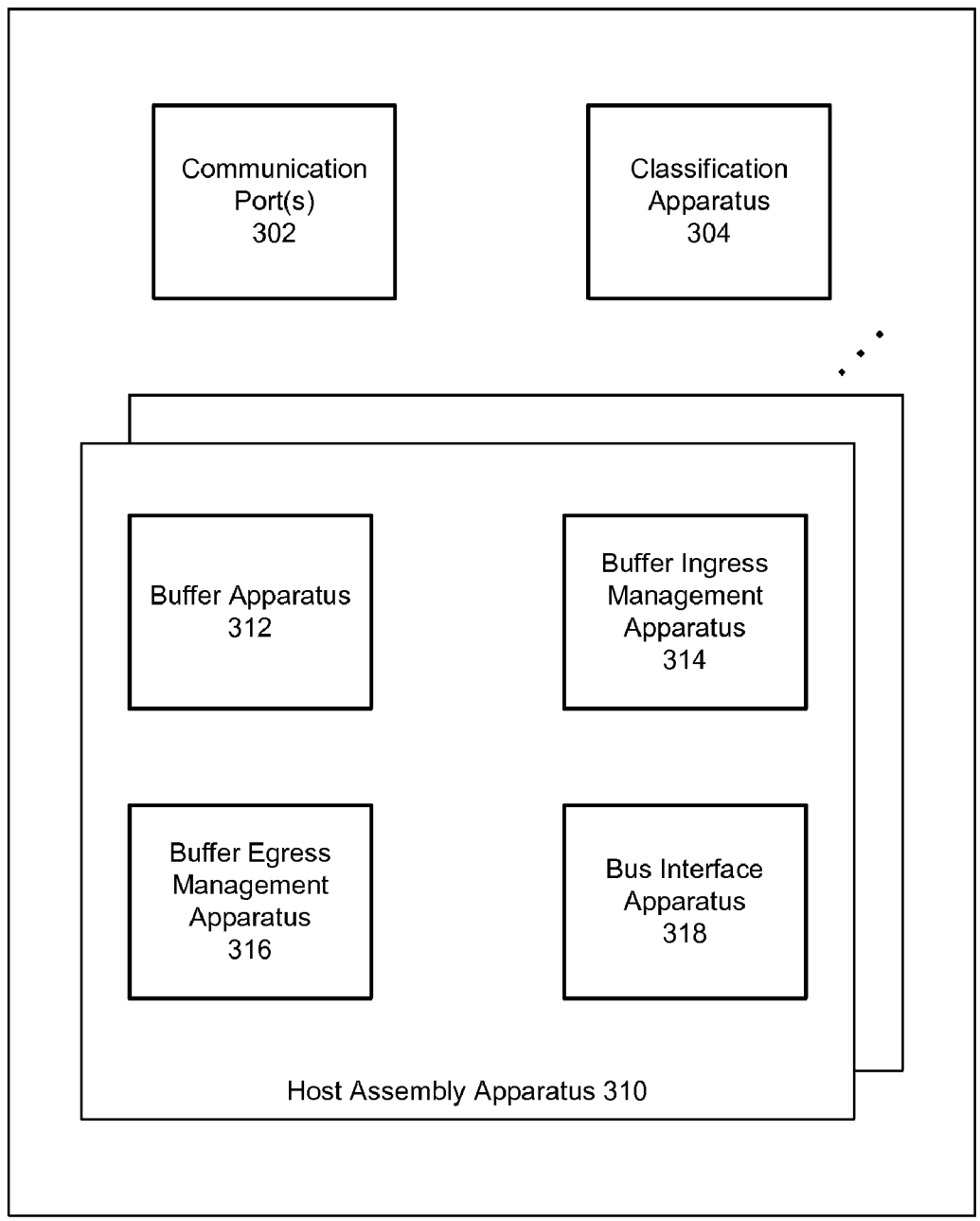
FIG. 3 is a block diagram of a communication apparatus that can be shared among multiple hosts and functions through virtualization of its ports, according to some embodiments of the invention.

FIG. 3 is a block diagram of a communication apparatus that can be shared among multiple hosts and functions through virtualization of one or more ports, according to some embodiments of the invention.

Communication apparatus 300 of FIG. 3 comprises one or more communication ports 302 for receiving packets, frames, datagrams, cells or other communications from networks or other communication links. Apparatus 300 also includes classification apparatus 304 and one or more host assembly apparatuses 310. Each host assembly comprises a buffer apparatus 312, one or more buffer ingress management apparatuses 314, buffer egress management apparatus 316 and bus interface apparatus 318. Each host assembly apparatus 310 is allocated to a single host, but can be dynamically reallocated to a different host, and multiple host assembly apparatuses may be concurrently allocated to the same host.

Classification apparatus 304 is adapted to classify a communication received at apparatus 300 to identify a physical or virtual function to which the communication is directed. To classify the communication, apparatus 304 may examine its contents (e.g., protocol headers, payload) and compare those contents to entries stored in one or more classification tables to identify a flow or connection to which the communication belongs. Apparatus 304 may also identify a function corresponding to the flow, select one or more DMA engines for transferring the communication to one or more functions, and/or perform other tasks to help direct the packet's data to its destination(s).

Each buffer apparatus 312 is adapted to store packets for transfer to its destination host and functions, along with separate control headers for each packet.

Access to each buffer apparatus is managed by a set of buffer ingress management apparatuses 314. As described above, for each function supported by the buffer, a separate buffer ingress management apparatus may be instantiated or activated to serve that function. The buffer ingress management apparatuses are adapted to apply dynamically programmable criteria to filter packets received from classification apparatus 304, so as to allow only packets desired by their corresponding functions to be stored in their associated buffer apparatus 312.

Departure of packet data from each buffer apparatus is managed by a set of buffer egress management apparatuses 316. The buffer egress management apparatuses are adapted to process each set of packet data according to control information stored in the buffer apparatus with the packet data. The control information may identify which host/function to transfer the packet data to, how to perform the transfer (e.g., which DMA engine, which bus interface logic), why the packet was accepted by the host assembly apparatus 310, etc.

Bus interface logic 318 is adapted to configure a packet for transmission to the destination host via the appropriate physical media.

The environment in which a present embodiment of the invention is executed may incorporate a general-purpose computer or a special-purpose device such as a hand-held computer or a computer server. Details of such devices (e.g., processor, memory, data storage, display) may be omitted for the sake of clarity.

Data structures and code described in this detailed description are typically stored on a computer-readable storage medium, which may be any device or medium that can store code and/or data for use by a computer system.

The computer-readable storage medium includes, but is not limited to, volatile memory, non-volatile memory, magnetic and optical storage devices such as disk drives, magnetic tape, CDs (compact discs), DVDs (digital versatile discs or digital video discs), and other media capable of storing computer-readable media now known or later developed.

Methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable logic devices now known or later developed. When the hardware modules or apparatus are activated, they perform the methods and processes included within them.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. An input/output device for simultaneously supporting multiple hosts and multiple functions, the input/output device comprising:
    a communication port through which the input/output device receives communications for the multiple hosts and multiple functions; and
    a plurality of host assemblies, each host assembly corresponding to a single host and comprising:
        a buffer configured to store communications destined for all functions hosted by the single host if the communications destined for the functions match a set of criteria, wherein the buffer is further configured to store control information associated with the communications for the functions, wherein the control information is configured to facilitate transfer of the communications for the functions to at least one destination function of the single host;
        a set of ingress managers configured to accept into the buffer only communications identified by functions hosted by the single host, wherein each ingress manager is configured to apply the set of criteria to determine whether to accept communications into the buffer for the single host for transfer to one of the functions hosted by the single host; and
        a set of egress managers configured to transfer communications from the buffer to the functions hosted by the single host, wherein each egress manager is configured to transmit the communications from the buffer toward the at least destination function when the communications are transferred from the buffer.

2. The input/output device of claim 1, further comprising:
    a traffic classifier configured to classify each communication received via the communication port.

3. The input/output device of claim 2, wherein a communication classified by the traffic classifier is distributed to each host assembly's set of ingress managers.

4. The input/output device of claim 1, wherein the set of ingress managers comprises:
    one or more VMAC (Virtual Medium Access Control) modules, each said VMAC module corresponding to one function hosted by the single host.

5. The input/output device of claim 1, wherein each set of egress managers comprises one or more DMA (Direct Memory Access) engines.

6. The input/output device of claim 1, wherein each said host assembly further comprises:
    bus interface logic configured to transfer a communication received from an egress manager to a specified function of the single host.

7. The input/output device of claim 1, wherein each buffer is dynamically allocable to any of multiple hosts.

8. The input/output device of claim 1, wherein each ingress manager is dynamically programmable to identify communications the ingress manager should accept into the buffer.

9. The input/output device of claim 4, wherein:
    each VMAC module comprises criteria for filtering communications; and
    said criteria are configured to identify communications desired by the VMAC module's corresponding function.

10. The input/output device of claim 6, further comprising a switch through which the bus interface logic transfers the communication to the single host.

11. A method of operating an input/output device to simultaneously support multiple hosts and multiple functions, the method comprising:
    classifying a packet received through a port of the input/output device configured to receive communications for the multiple hosts and the multiple functions;
    at each of multiple host assemblies, wherein each host assembly is allocated to one of the multiple hosts hosting a subset of the multiple functions:
    applying a set of criteria to determine whether to store the packet in a buffer for transfer to one of the subset of functions hosted by the corresponding host;
    storing the packet in the buffer if the packet matches the set of criteria; and
    if the packet is stored in the buffer, storing in the buffer associated control information configured to facilitate transfer of the packet to at least one destination function of the corresponding host; and
    when the packet is extracted from the buffer, transmitting the packet toward the at least one destination function.

12. The method of claim 11, further comprising:
    for each of the multiple buffers, programming a set of ingress managers to screen packets for storage in the buffer.

13. The method of claim 12, wherein each ingress manager is associated with a function hosted by the corresponding host.

14. The method of claim 13, wherein each ingress manager is programmed to accept packets classified for the associated function.

15. The method of claim 13, wherein each ingress manager is programmed to accept packets having attributes identified by the associated function.

16. The method of claim 12, wherein said transmitting comprises:
   operating an egress manager comprising multiple DMA (Direct Memory Access) engines to activate one or more DMA engines corresponding to the at least one destination function.

17. The method of claim 16, wherein the egress manager transmits the packet via a first bus interface.

18. The method of claim 17, further comprising:
   reallocating a first host assembly from one host to a different host;
   wherein after said reallocating, the egress manager transmits a subsequent packet to the different host via a different bus interface.

19. A non-transitory processor-readable medium storing instructions that, when executed by a processor, cause the processor to perform a method of operating an input/output device to simultaneously support multiple hosts and multiple functions, the method comprising:
   classifying a packet received through a port of the input/output device configured to receive communications for the multiple hosts and the multiple functions;
   at each of multiple host assemblies, wherein each host assembly is allocated to one of the multiple hosts hosting a subset of the multiple functions:
   applying a set of criteria to determine whether to store the packet in a buffer for transfer to one of the subset of functions hosted by the corresponding host;
   storing the packet in the buffer if the packet matches the set of criteria; and
   if the packet is stored in the buffer, storing in the buffer associated control information configured to facilitate transfer of the packet to at least one destination function of the corresponding host; and
   when the packet is extracted from the buffer, transmitting the packet toward the at least one destination function.

* * * * *